United States Patent
Krill et al.

(10) Patent No.: US 7,187,866 B2
(45) Date of Patent: Mar. 6, 2007

(54) SYSTEM FOR DISTRIBUTING INFORMATION AND ENERGY USING FIBER OPTIC AND OPTICAL WIRELESS NETWORKS

(75) Inventors: Jerry A. Krill, Ellicott City, MD (US); Joseph Cipriano, Springfield, VA (US); Donald D. Duncan, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 717 days.

(21) Appl. No.: 10/613,854

(22) Filed: Jul. 3, 2003

(65) Prior Publication Data

US 2004/0141744 A1    Jul. 22, 2004

Related U.S. Application Data

(60) Provisional application No. 60/455,235, filed on Mar. 17, 2003, provisional application No. 60/441,428, filed on Jan. 21, 2003.

(51) Int. Cl.
*H04J 14/02* (2006.01)
(52) U.S. Cl. .................................................. 398/91
(58) Field of Classification Search ............... 398/172, 398/127, 79, 91
See application file for complete search history.

(56) References Cited

U.S. PATENT DOCUMENTS

| | | | | |
|---|---|---|---|---|
| 4,297,000 A | * | 10/1981 | Fries | 362/557 |
| 5,371,660 A | * | 12/1994 | Levens | 362/552 |
| 5,602,668 A | * | 2/1997 | Kuchta | 398/172 |
| 6,486,994 B1 | * | 11/2002 | Giles | 398/117 |
| 6,639,733 B2 | * | 10/2003 | Minano et al. | 359/728 |
| 7,024,422 B2 | * | 4/2006 | Abdo | 707/102 |
| 2002/0141011 A1 | * | 10/2002 | Green et al. | 359/118 |
| 2002/0171896 A1 | * | 11/2002 | Clark et al. | 359/172 |
| 2003/0215242 A1 | * | 11/2003 | Oettinger et al. | 398/118 |

OTHER PUBLICATIONS

Newton's Telecom Dictionary, 14th edition, 1998, p. 342, item "heat".*

* cited by examiner

*Primary Examiner*—Shi K. Li
(74) *Attorney, Agent, or Firm*—Albert J. Fasulo, II (57) ABSTRACT

Disclosed is a system for distributing information and photonic energy into at least one room of a building, comprising a lighting generator for generating visible light energy, an infrared (IR) heat generator for generating IR heat energy, and an optical fiber subsystem for transceiving at least one of the visible light energy and the IR heat energy into the at least one room, wherein the optical fiber subsystem can carry optical information signals throughout the optical fiber subsystem and radiate the optical information signals as optical wireless signals into the at least one room and receive optical wireless signals from the at least one room.

19 Claims, 8 Drawing Sheets

SYSTEM FOR DISTRIBUTING INFORMATION AND ENERGY USING FIBER OPTIC AND OPTICAL WIRELESS NETWORKS

CROSS-REFERENCE TO RELATED APPLICATION

This application claims the benefit of the co-pending U.S. provisional applications Nos. 60/455,235, filed on Mar. 17, 2003, and 60/441,428 filed Jan. 21, 2003, which are hereby incorporated by reference in their entirety.

BACKGROUND OF THE INVENTION

1. Field of the Invention

The present invention relates generally to a system and method of distributing information and energy, and in particular, to a system and method of distributing information, light, and thermal energy using fiber optics and optical wireless networks.

2. Description of the Related Art

With the onslaught of the digital era, the need for the ability to transmit greater and greater amounts of information is of major concern to users and service providers. This information includes voice communications, data communications and video data. One method used to transmit almost unlimited amounts of information is through the use of fiber optic systems. The fiber optic systems can transmit vast amounts of data to a great number of users, all at the speed of light. Although this increase in data transfer is possible in fiber optic systems, present wireless optical technologies are limited in their bandwidth capacities. Another method for the transmission of information is through the use of wireless networks. Cellular and Bluetooth™ technologies are common relatively short distance wireless transmission systems. Satellite and microwave systems provide longer-range wireless transmission distances, but are quite susceptible to atmospheric conditions, and the microwave systems in cases of over-exposure may cause bodily injury. Each of these systems can be utilized in one degree or another in buildings to transceive data and voice communications. Unfortunately, the freedom associated with the wireless systems cannot be combined with the bandwidth capabilities available to the fiber optic based systems. Also, the IEEE 802.11 infrared extension uses an infrared (IR) band that is not compatible with present fiber optic systems and requires extensive conversion hardware, which limits total bandwidth capabilities. Other proposed systems include optical wireless systems and millimeter band systems. Unlike much longer wavelength systems, such as microwave, cellular and cordless technologies, optical and millimeter bands do not penetrate building structures as thoroughly, and so a means for effective distribution of coverage for these wavelengths within buildings is a prerequisite to convenient communications.

Another well-known use of optical fibers is the transmission of small amounts of decorative lighting. One example commonly found on the market is to provide colored lighting input into optical fibers to illuminate the tips of the fibers for use as Christmas trees and other decorations. These uses only deliver a small amount of light per optical fiber and have been limited to purely decorative functions.

Providing light to all areas of a building requires the installation of standard copper wires and lamps. The typical lamps are fluorescent or incandescent. These wire based systems are electrically and thermally less than ideal. The energy losses in the copper wires caused by their internal resistances are also less than ideal. Additionally, the loss of thermal energy, particularly in incandescent lamps, is quite high. If copper wires are used to convey information signals, however, the bandwidth is extremely limited because large variations in resistance and propagation speed over the frequency spectrum of such a signal cause severe corruption due to "signal dispersion".

Another area of consumer concern is the heating and cooling of buildings and other indoor environments. Great amounts of money and time are spent on research to develop and produce systems that conserve energy, limit energy losses and are environmentally friendly. For example, insulating pipes in a hydronic heating system is one method to reduce energy losses in the system; insulating ductwork in a forced air system is another. Also, in both the hydronic and forced air heating systems, the space required for piping the hydronic system and installing the ductwork for the forced air system increases building outfitting costs and limits the usable space.

Individually, each of these systems can provide certain functions, but efficient systems for the distribution of information, light and thermal energy that save money, space and energy have yet to be developed. Also, the redundancy needed to incorporate each of the systems into a building escalates that costs dramatically.

There is therefore a need to provide an information and energy distribution system that is economical, space saving and that can increase energy efficiency, while providing unprecedented fiber-compatible wireless performance (Giga (G) to tera bits-per-second (bps)) and user mobility without receptacles, the ability to provide heating, with the elimination of pipes/ducts and mechanical furnaces/air conditioning, for greater efficiency, cleanliness, reliability, and control, and a central, room controlled lighting for greater light energy efficiency especially in large buildings.

SUMMARY OF THE INVENTION

It is, therefore, an aspect of the present invention to provide a system for distributing information and photonic energy into at least one room of a building.

In accordance with another aspect of the present invention, there is provided a fiber optic and optical wireless system for distributing information and photonic energy into at least one room of a building, wherein virtually an unlimited number of rooms could be serviced, from single family homes to large skyscraper complexes.

The foregoing aspects of the present invention are realized by a system for distributing information and photonic energy into at least one room of a building, comprising a lighting generator for generating visible light energy, an infrared (IR) heat generator for generating IR heat energy, and an optical fiber subsystem for transceiving at least one of the visible light energy and the IR heat energy into the at least one room, wherein the optical fiber subsystem can carry optical information signals throughout the optical fiber subsystem and radiate the optical information signals as optical wireless signals into the at least one room and receive optical wireless signals from the at least one room.

BRIEF DESCRIPTION OF THE DRAWINGS

The above and other objects, features and advantages of the present invention will become more apparent from the following detailed description when taken in conjunction with the accompanying drawings in which.

DESCRIPTION OF THE PREFERRED EMBODIMENTS

Embodiments of the present invention will be described herein below with reference to the accompanying drawings. In the following description, well-known functions or constructions are not described in detail since they would obscure the invention in unnecessary detail. Also, throughout the application no distinction will be made between voice and data communications, and the terms "data communication", "information" and "data" will be used herein without intending to exclude other types of information or communications. Also, the term "transceive" (and derivatives thereof such as "transceiving") as used herein is used broadly to mean either "transmit" or "receive", and more specifically to mean "transmit and receive". Similarly, a transceiver generally includes a transmitter and a receiver, but may also include only a transmitter or only a receiver.

Figure 1:
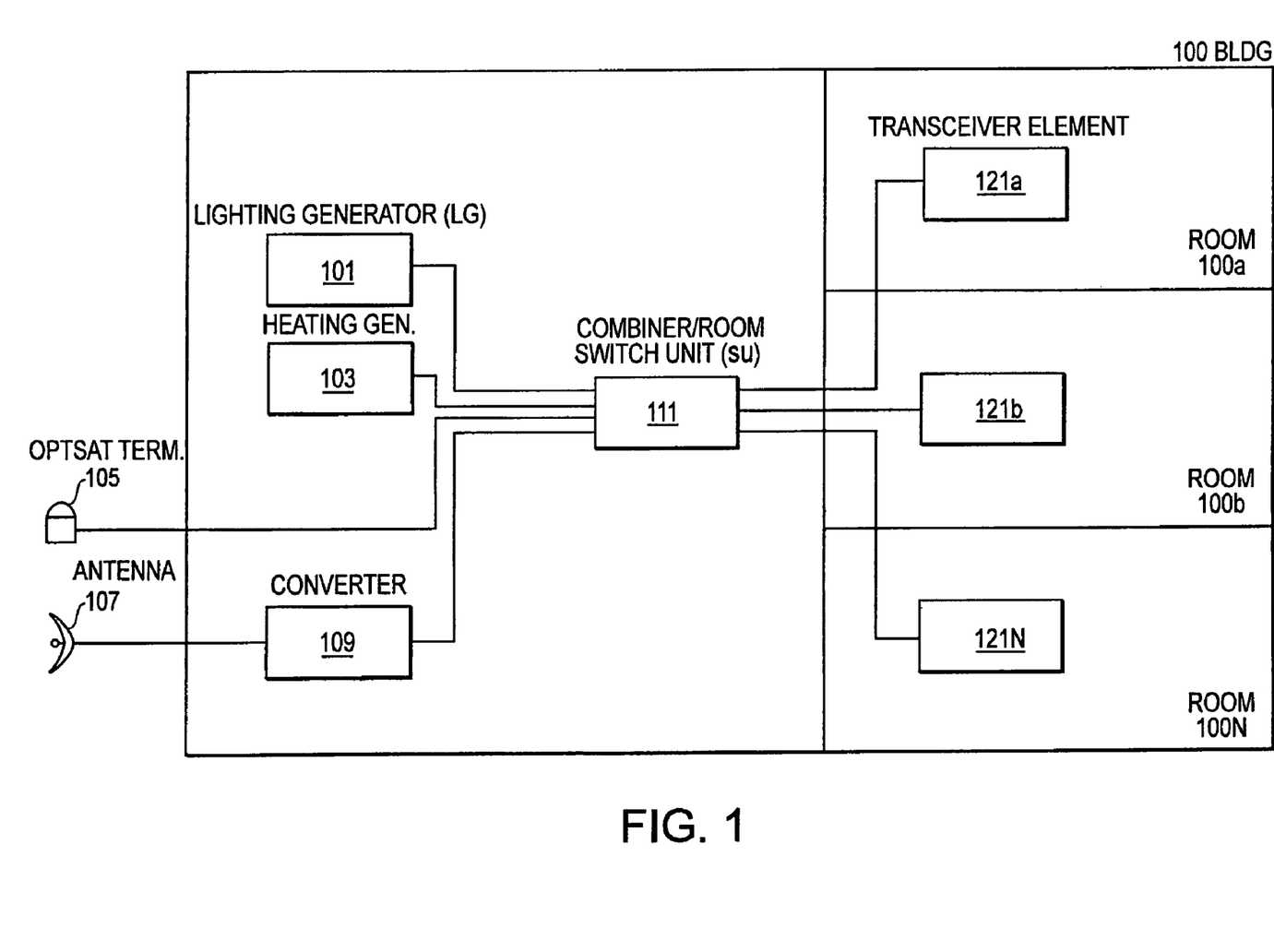
FIG. 1 is a block diagram of the system for distributing information, light, and thermal energy using fiber optics and optical wireless networks according to an embodiment of the present invention.

FIG. 1 is a block diagram of the system for distributing information, light, and thermal energy using fiber optics and optical wireless networks according to an embodiment of the present invention.

Shown in FIG. 1 is building 100 having rooms 100a, 100b to 100N. The number of rooms that the present invention can service can be from one room in a house to hundreds of rooms in an office building. Also shown in FIG. 1 are lighting generator 101 for generating visible waveband light, and infrared (IR) heating generator 103 for generating IR band heat energy. Although these two units are shown separately, they can be combined into one unit, each of which will be described in more detail with respect to FIG. 2.

Also shown in FIG. 1 is OPTSAT (OPTical SATellite) terminal 105. The OPTSAT terminal 105 is a device that transmits and receives optical wireless waveband signals to and from low to high altitude satellites, with a back-up millimeter waveband transceiver system. The OPTSAT system operates in the optical waveband and is capable of transceiving high-speed, wideband data and voice communications. An exemplary OPTSAT system is further disclosed in co-pending U.S. application entitled "Satellite-Based Mobile Communication System", assigned Ser. No. 10/317,456, and filed on Dec. 12, 2002, the entire contents of which are incorporated herein by reference. The OPTSAT system is revolutionary for line of sight communications, but do not effectively transmit into structures due to the inherent nature of optical wireless signals, thus transition systems are required.

The use of optical wireless systems is of great benefit to the communications industry. As stated earlier, fiber optic systems can transceive great amounts of information to large numbers of users. The wide bandwidth of the fiber optic cable enables these high numbers. For the first time, with the use of the present invention, 'free space wireless' transmissions comparable in bandwidth to that of fiber optics is achievable. For example, the invention variants will range from up to 1G bps per user device (with up to hundreds/thousands of user devices per room) for the simple configuration, or from 10G bps to 1 tera-bps (Tbps) per user device, for a more complex, but fully fiber-transparent wireless and up to dozens of devices in a single room. In order to maintain the high transmission numbers, the use of optical wireless systems as those described in the above referenced co-pending application and the use of channel and waveform structures in similar 1550 nm wavelength systems, assures all-optical, 'transparent' transitions from wireless to fiber without any waveform or wavelength conversion requirements or hardware. This greatly reduces the costs of the overall systems.

Returning again to FIG. 1, shown is microwave antenna 107 for transceiving voice and data information via microwave band signals, and converter 109 for converting the microwave signals to and from optical signals.

The OPTSAT system and microwave system are two examples of transmission systems external to the building that can be used to transceive information. Although these two systems are used as examples herein, other systems (e.g., cellular, PCS, etc.) can be incorporated without departing from the scope of the present invention. One other example is an information distribution system disclosed in a co-pending U.S. application entitled "System And Method For Distribution Of Information Using Wideband Wireless Networks", assigned Ser. No. 10/374,491, and filed on Feb. 26, 2003, the entire contents of which are incorporated herein by reference. The system disclosed in this co-pending application uses optical wireless networks and millimeter wave band signals to transceive data and voice communications between buildings and service providers. Hardwired optical cable systems can also be incorporated into the system of the present invention to provide the external transceiving functions. In general, for use in the present invention, all that is required is that the external signal can be converted into an optical signal. Additionally, the system is Internet, Ethernet, and telecommunications friendly, as each of these systems has already been adapted for fiber optic transmission.

Returning again to FIG. 1, shown is optical combiner/room switching unit 11 1, for combining optical energy and signals and switching the signals and energy to (and from in the case of the information signals) rooms 100a to 100N, and is shown connected to lighting generator 101, IR heating generator 103, OPTSAT terminal 105 and converter 109. All of the connections shown in FIG. 1, excluding the microwave connection between microwave antenna 107 and converter 109, are optical fibers. Local transceiver elements 121a to 121N, for "converting" and "transmitting" into the rooms the optical signals and energy into wireless signals and energy, are shown connected to optical combiner/room switching unit 111. The term "converting" is used here, but as will be seen in more detail with reference to FIG. 4, the energy is not actually converted, but remains in an optical form and is "transmitted", "focused", "diffused" or "radiated" as light, heat and information, depending on the particular requirements. Also, even though optical combiner/room switching unit 111 is shown in the preferred embodiment, this element can be removed from the lighting and heating systems, whereby the output of these systems would then be routed directly to the rooms, and in a single information system the optical combiner/room switching unit 111 could be dispensed with provided no special switching was required. Also, the lighting and heating systems can be combined as stated earlier.

IR heating via fiber-optic distribution is embodied in the present invention. A typical optical fiber can carry photonic energy in the power range of ten watts, and therefore, bundles of infrared photon-carrying fiber optic lines can be provided for heating. Photonic energy is also used herein to describe the lighting energy transmitted through the optical fiber system of the present invention. The approach takes advantage of the very low photonic energy loss characteristics of optical fibers that can compete with the energy efficiency of various forms of heating. Specialty fibers such as sapphire or chalcogenides can be used to enhance IR photonic energy transmission. Also, hollow glass fibers can be used to efficiently transmit the IR photonic energy. To further decrease any photonic losses, the optical fibers can be insulated. It is recognized that present fiber-optic technology designs may need to be 'tuned' for higher power capacity and for the particular infrared heating wavelengths determined most effective. The lighting and heating would be best served with a diffuser and multimode fiber combination for broadest illumination of a room. The diffuser/multimode combination can also support information up to 1G bps per user (for up to hundreds of users per room), but on a different fiber line so as not to burn out a transmit/receive amplifier assembly utilized in the data transmission system with thermal energy from light/heat signals, although variants of the system that will be described later in detail, can compensate for any shortcomings. Also, in higher performing 1G bps to possibly 1T bps per user capability systems with Microelectromechanical Systems MEMS/single mode fiber, the number of users is limited only by the number of MEMS elements in the assembly.

A description of the operation of the system for distributing information, light, and thermal energy using fiber optics and optical wireless networks according to an embodiment of the present invention will now be presented with respect to FIG. 1. Light is generated in lighting generator 101 and transmitted through fiber optic cable to optical combiner/room switching unit 111; and IR heating energy is generated in IR heating generator 103 and transmitted through fiber optic cable to optical combiner/room switching unit 111. Information transceived from OPTSAT terminal 105 is transmitted through fiber optic cable to optical combiner/room switching unit 111; and information transceived from microwave antenna 107 is converted into an optical signal by converter 109 and transmitted through fiber optic cable to optical combiner/room switching unit 111. It is noted here that all data transmissions throughout the system are capable of standard bi-directional or full-duplex communications. Optical combiner/room switching unit 111 then combines the lighting, heating and data and performs a switching function to direct the energy and/or information to rooms 100a to 100N that request them. Each of rooms 100a to 100N can have individual control of the lighting, heating or information supplied thereto, or they can be flooded into all of the rooms and controlled centrally, or any combination thereof. The use of switches and splitters at each room will be discussed further below with respect to FIG. 4. The actual control and switching functions are not central to the present invention, and all known lighting, heating and data switching and control devices are contemplated.

After the energy and/or information has been switched by optical combiner/room switching unit 111 to rooms 100a to 100N, the local transmit/receive elements 121a to 121N disburse the lighting, heating and/or data into the respective rooms. The lighting, heating and/or data are preferably wirelessly transmitted into the rooms using optical lenses, diffusion lenses, heating elements, etc., depending on the particular application. It is also contemplated that fiber optic systems can be used to directly connect to devices with fiber optic capabilities. Further details of the local transmit/receive elements 121a to 121N will be described in more detail below. The light and heat are transmitted into the rooms to provide ambient lighting and heating. The data is transmitted into the rooms and received by various devices, which may include televisions, computers, controllers, thermostats, appliances, telephones, etc.

Figure 2:
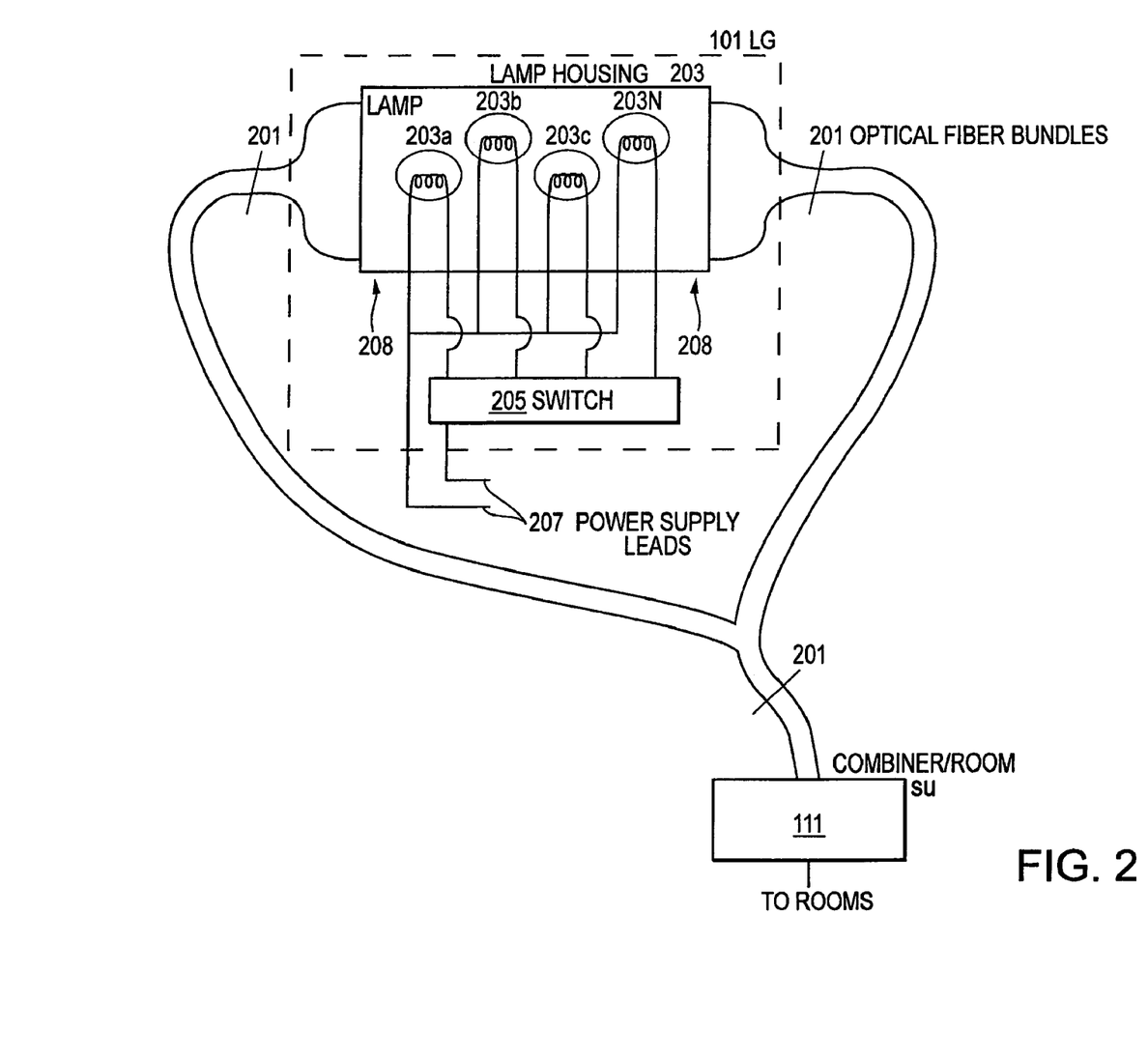
FIG. 2 is a diagram of the lighting generator shown in FIG. 1.

FIG. 2 is a diagram of the lighting generator 101 according to an embodiment of the present invention. Shown in FIG. 2 is lighting generator 101 connected to optical combiner/room switching unit 111 by optical fiber bundles 201. The optical fiber bundles 201 are used to increase the total lighting capacity of the system, as one optical fiber is typically not sufficient to carry light or heat energy for lighting or heating a room. Shown inside of lighting generator 101 is lamp enclosure 203 for housing lamps 203a to 203N. Each of lamps 203a to 203N is shown connected to lamp switch 205 for switching the lamps on and off depending on the system lighting requirements. For example, if no light were required in the building, all of lamps 203a to 203N would be switched off. If lighting were required, only those lamps needed to generate the required lighting would be turned on. The lamps are shown staggered in FIG. 2 to maximize photonic output collection by the lenses and/or optical fibers, by preventing blockage. Also shown are power supply leads 207 for providing power to lamps 203a to 203N. The inside of lamp enclosure 203 preferably includes a high reflective inner surface to increase the efficiency of the system. At the ends 208 of lamp enclosure 203, lenses can be used to focus the light into the fiber optic bundles. Although a tubular shape is depicted in FIG. 2, other shapes are contemplated. The tubular shape lends to convenient lens applications. The lamps can be of the same or varying types, and laser technology capable of generating visible light can also be incorporated into the system with minor modifications. Also, a bank of lasers could be utilized much more efficiently than the lamps (and more cost effectively in some cases). Each laser (IR wavelength or a visible color) could transmit into its own fiber. Also, note that sending individual light colors (i.e. red, green, blue) could allow controlled in-room light hues by combination of colors.

The heating generator 103 is of a similar construction to that of the lighting generator 101 of FIG. 2. The only modifications required are the replacement of the lamps 203a to 203N with IR heat lamps. Typical optical fibers can carry about 10 watts of power. By bundling the fiber optics, many tens or hundreds of watts of power can be transmitted. It has been determined that between tens and hundreds of watts is enough light but not enough heat for larger rooms. There is no limit to power other than the number of parallel fibers, even for extended periods at kilowatts (KW) of power. So, for a typical 10 W per fiber system, 1 KW would only require 100 fibers. The fibers can be packaged in a more economical combination than the present info-bearing fiber bundles, i.e. more individual fibers per bundle. The lamp enclosure 203 would also be insulated to prevent undue loss of heat energy. In addition, the lighting generator 101 and heating generator 103 can be combined into one unit, wherein the lamp enclosure 203 would include light generating lamps and IR heat generating lamps, each switched on and off as needed. The above-described heating system is particularly valuable since fiber optics exhibit low light and heat energy losses, thus providing an "insulated" lighting and heating conduit. The IR heating energy is carried through the fiber optic bundles 201, through optical combiner/room switching unit 111, and into the rooms to be radiated. The transfer of the heat from the optical fibers into the room can be assisted via heat sinks or blower units as required.

Figure 3A:
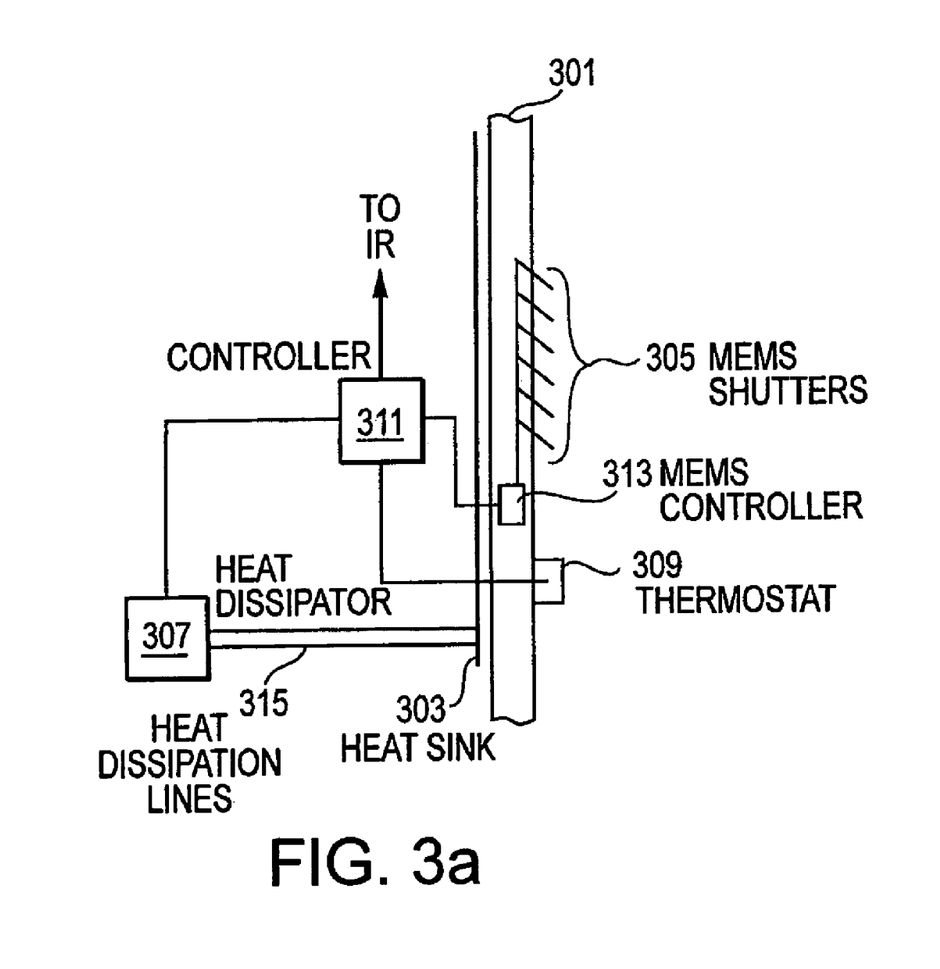
FIGS. 3a and 3b are diagrams of a cooling system according to an embodiment of the present invention.
Figure 3B:
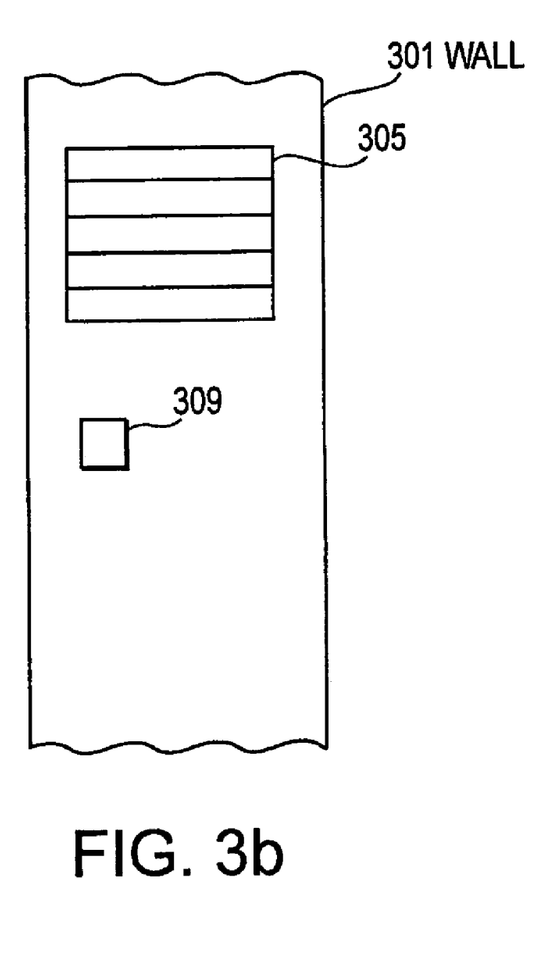

As with any complete environmental control system, both heating and cooling are required. One popular method to cool an environment is to pump air at a temperature lower than the ambient temperature into a room. Many of these forced air systems are in use and require expensive and bulky ductwork as discussed earlier. Another method to reduce the temperature in a room is to remove the heat itself from the room. FIG. 3 (i.e., FIGS. 3a and 3b) is a diagram of a cooling system according to an embodiment of the present invention. Shown in FIG. 3 are wall 301 defining an inside space (to the right of the wall) and an outside space (to the left of the wall), heat sink 303 for removing heat from the room, micro-electro mechanical system (MEMS) shutters 305 for opening and closing to allow or block the transfer of heat into the heat sink 303, and MEMS controller 313 for controlling the position of the MEMS shutters 305. In their closed state, the MEMS shutters 305 retain heat in the room; in their opened state, the MEMS shutters 305 allow heat to contact heat sink 303. Also shown is heat dissipater 307 for removing the heat from the heat sink 303 through heat dissipation lines 315. The heat dissipater 307 can be a radiator or refrigeration unit, or other heat dissipation device. Finally, thermostat 309 is shown connected to controller 311, which is in turn connected to heat dissipater 307, IR heating generator 103, and MEMS controller 313 to allow for the regulation of the heating and cooling of the room. A full explanation of the MEMS shutters is disclosed in *MEMS In Aerospace Applications—Thermal Control Shutters*, The Johns Hopkins University Applied Physics Laboratory, Laurel, Md, by R. Osiander, J. L. Champion, and M. A. Darrin, the entire contents of which are incorporated herein by reference.

A description of the environmental temperature control will now be described with respect to FIGS. 3a and 3b. Thermostat 309 is set to a comfortable temperature. When the air temperature rises above the set temperature, controller 311 sends a signal to MEMS controller 313 to open MEMS shutter 305, allowing the room air to contact with the heat sink 303. The heat to be removed is "absorbed" by heat sink 303 and carried through heat dissipation lines 315 to heat dissipater 307. Controller 311 also sends a signal to heat dissipater 307 to turn on. When the room temperature has lowered to the set temperature as determined by thermostat 309, controller 311 sends a signal to MEMS controller 313 to close MEMS shutters 305, and a signal to heat dissipater 307 to turn off. It is to be noted that the control lines between the controller 311, thermostat 309, MEMS controller 313, and to the R heating system can be incorporated into the optical wireless system to wirelessly transmit control signals to the various components of the heating system. To provide extra insulating effects to the MEMS shutters 305, an insulating coating can be provided on the room side of the MEMS shutters 305 to prevent unwanted dissipation of heat through the MEMS shutters 305. When the shutters are closed, the insulation allows heat build-up as infrared radiation floods the room. The heat illumination is halted when an in-room thermostat indicates that the desired temperature is achieved. To further reduce the heat in a room to a desired temperature, the MEMS shutters 305 are opened as necessary on all walls or portions of walls to allow photons to strike the underlying heat sink 303. The heat energy is thereby dissipated into the thermally conducting layer of the wall. In addition to capturing photons, the air convection contact with the 'cool' metal surface further couples heat energy from the room into the heat sinks 303. Use of other thermally emissive material may also allow a similar heat escape mechanism. Of course this approach may be supplemented by fan airflow and an escape ventilation system to accelerate the cooling time as well as provide fresh air.

If heat is required in a room, i.e. the room temperature falls below the temperature set on thermostat 309, controller 311 sends a signal to the IR heating system to provide heat to the rooms. The heating operation will be described in greater detail below with respect to FIG. 4.

Figure 4:
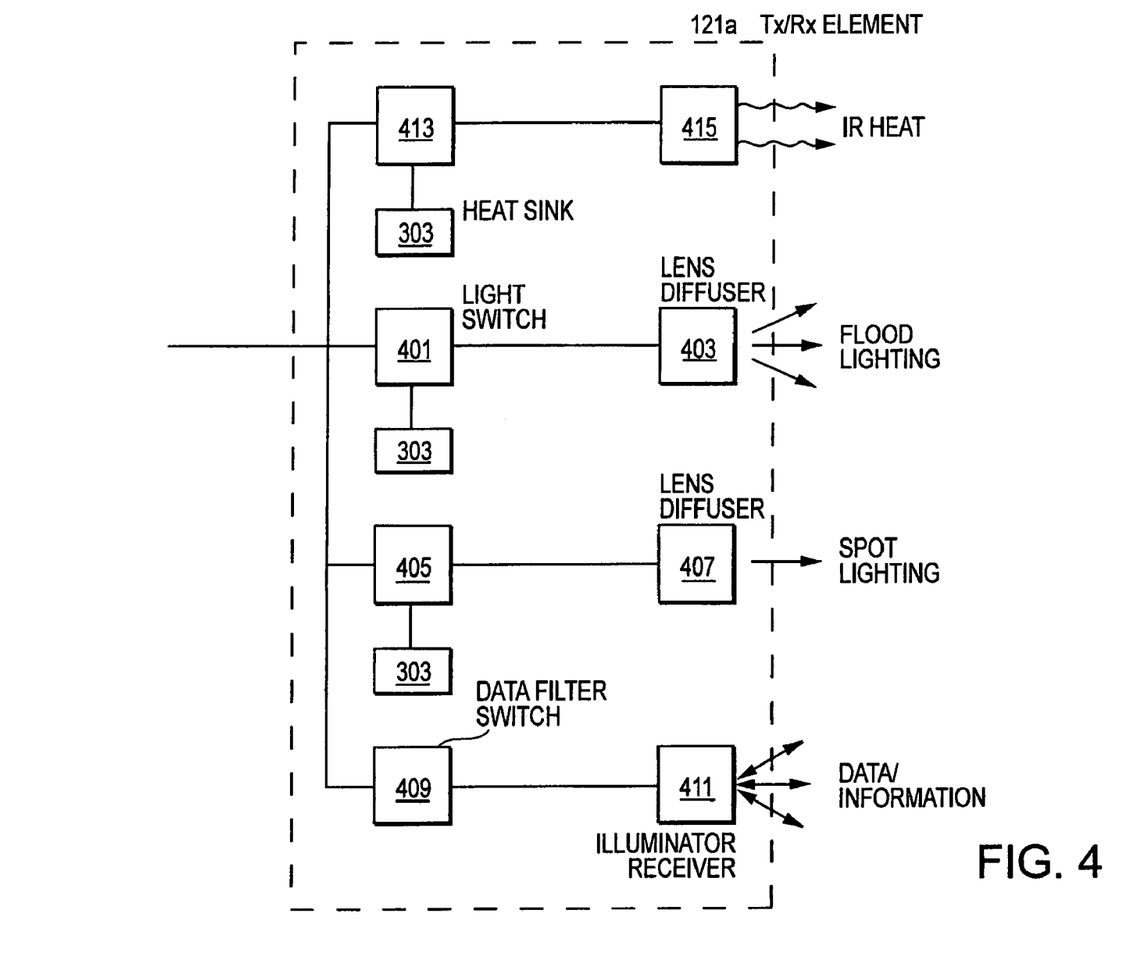
FIG. 4 is a block diagram of a local transmit/receive element of FIG. 1.

FIG. 4 is a block diagram of a local transmit/receive element of FIG. 1 according to an embodiment of the present invention. All connections shown in FIG. 4 are one or more than one fiber optic cable. Shown in FIG. 4 is local transmit/receive element 121a. Include therein are light switch 401 for controlling the output of light from lens/diffuser 403, light switch 405 for controlling the output of light from lens/diffuser 407, data filter/switch 409 for filtering and controlling the output of data through room illuminator/receiver 411, and heat switch 413 for controlling the output of IR heat from diffuser 415. Data filter/switch 409 can be used to filter or switch signals entering a room if only certain signals are to enter certain rooms. The room illuminator/receiver 411 floods the data and information into the room. Light switches 401 and 405 and heat switch 413 are each shown connected to heat sink 303 for controlling the amount of photonic energy to be passed through lens/diffusers 403 and 407 and diffuser 415. Typically, bundles of fiber optic cables would be used to carry the lighting and heat energy to the light switches 401 and 405 and heat switch 413. The switches would "ground" the individual optical fibers to the heat sink 303 to control the level of lighting and heat, and act as light and heat dimmers. The room configuration shown indicates elimination of excess lighting and heat by switching individual lines into the heat sink 303. In this case each fiber could carry a portion of the total room heat and light capacity and 'ground out' the excess. An alternative would be to replace the switch with a series of switches and splitters to halve the delivered energy as necessary with each splitter/switch layer, sending half forward and half to a heat sink. For greater energy-saving efficiency a "switch-back" switch bank could be provided to rotate excess energy to other rooms.

As shown in FIG. 4, lens/diffusers 403 and 407 are set or chosen to provide flood lighting in the case of lens/diffuser 403, and provide spot lighting in the case of lens/diffuser 407. Focusing or diffusing the visible light emanating from the optical fibers can control the ambient lighting.

Also, as the information distribution system of the present invention preferably uses standard 1550 nm fiber optic technology, the end user equipment can remain unaltered, except for a small optical wireless attachment.

Figure 5:
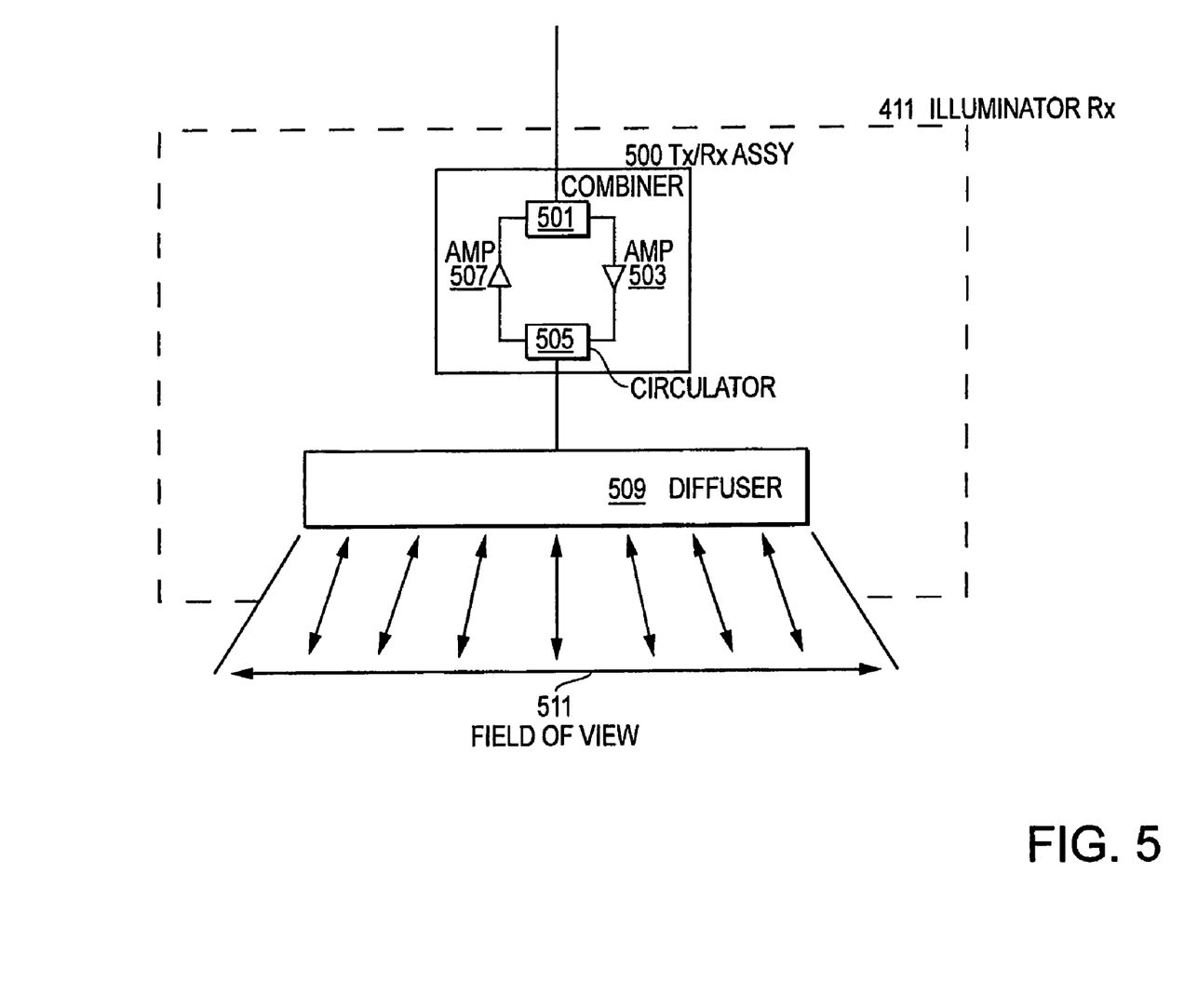
FIG. 5 is a block diagram of a room illuminator/receiver as shown in FIG. 4.

FIG. 5 is a block diagram of a room illuminator/receiver as shown in FIG. 4 according to an embodiment of the present invention. Shown in FIG. 5 are combiner 501 for combining the transmission and reception information signals from filter/switch 409 shown in FIG. 4, erbium transmit amplifier 503 for amplifying the transmission signals, erbium receive amplifier 507 for amplifying the reception signals, and circulator 505 for directing the transmission and reception signals to and from optical holographic diffuser 509. Depending on the design of optical holographic diffuser 509, the field of view 511 can be widened or narrowed depending on the room requirements. Although erbium amplifiers are used in the preferred embodiment, as they are compatible with 1550 nm optical signals, the use of other optical amplifiers and wavelengths are contemplated.

The room illuminator/receiver 411 is assumed installed in the ceiling or walls of each room in a building. The erbium laser transmit and receive amplifiers 503 and 507 are the same component as used in the OPTSAT concept as disclosed in the above-referenced co-pending U.S. application Ser. No. 10/317,456. The laser gain and power requirements are much less in the present invention since the range of the OPTSAT system is on the order of thousands of km range, wherein the present invention requires power amplification on the order of tens of meters. The optical holographic diffuser 509 utilizes the 'shower curtain effect' to disperse transmissions to flood the room with the data signals. The optical holographic diffuser 509 is not efficient when receiving transmissions from devices at great distances, but the distances in a room of the present invention are short enough that sufficient power (i.e. less than 0.25 watts) from the user transmissions can assure ample reception quality for erbium amplification.

A description of the operation of the room illuminator/receiver 411 will now be presented with reference to FIG. 5. As data enters room illuminator/receiver 411 it is received in transmit/receive assembly 500 and split by combiner 501 and amplified by erbium transmit amplifier 503. The room environment would determine the level of amplification. For example, in large and humid environments, more amplification would be required to cover all areas of the room, but if a small and dry room were being flooded by the signal, much less amplification would be needed. Circulator 505 receives the amplified signal from erbium transmit amplifier 503 and forwards it to optical holographic diffuser 509 which diffuses the signal for flooding into the room. The signals at this point are optical wireless signals. Devices in the room then receive the optical wireless signals. Certain devices, such as telephones or computers, would also transmit optical wireless signals to optical holographic diffuser 509. The reception and transmission of the optical wireless signals to and from the devices will be described in further detail below. When optical holographic diffuser 509 receives optical wireless signals, the signals are focused into the optical fibers and forwarded to circulator 505. Circulator 505 forwards the received signals to erbium receive amplifier 507 that amplifies the received signals. The level of amplification needed is again dependent upon room environment as described above with reference to the transmission signals. The amplified signals are forwarded to combiner 501 for transmission back into the rest of the system. These signals, depending on specific routing and protocols, could be sent to other devices in the building or to the OPTSAT terminal 105 or microwave antenna 107 for transmission outside of the building. It is generally contemplated that one wavelength is required for each illumination signal and one wavelength for each reception signal of the room. Multiplexing of optical signals is also contemplated for rooms with multiple devices.

Figure 6:
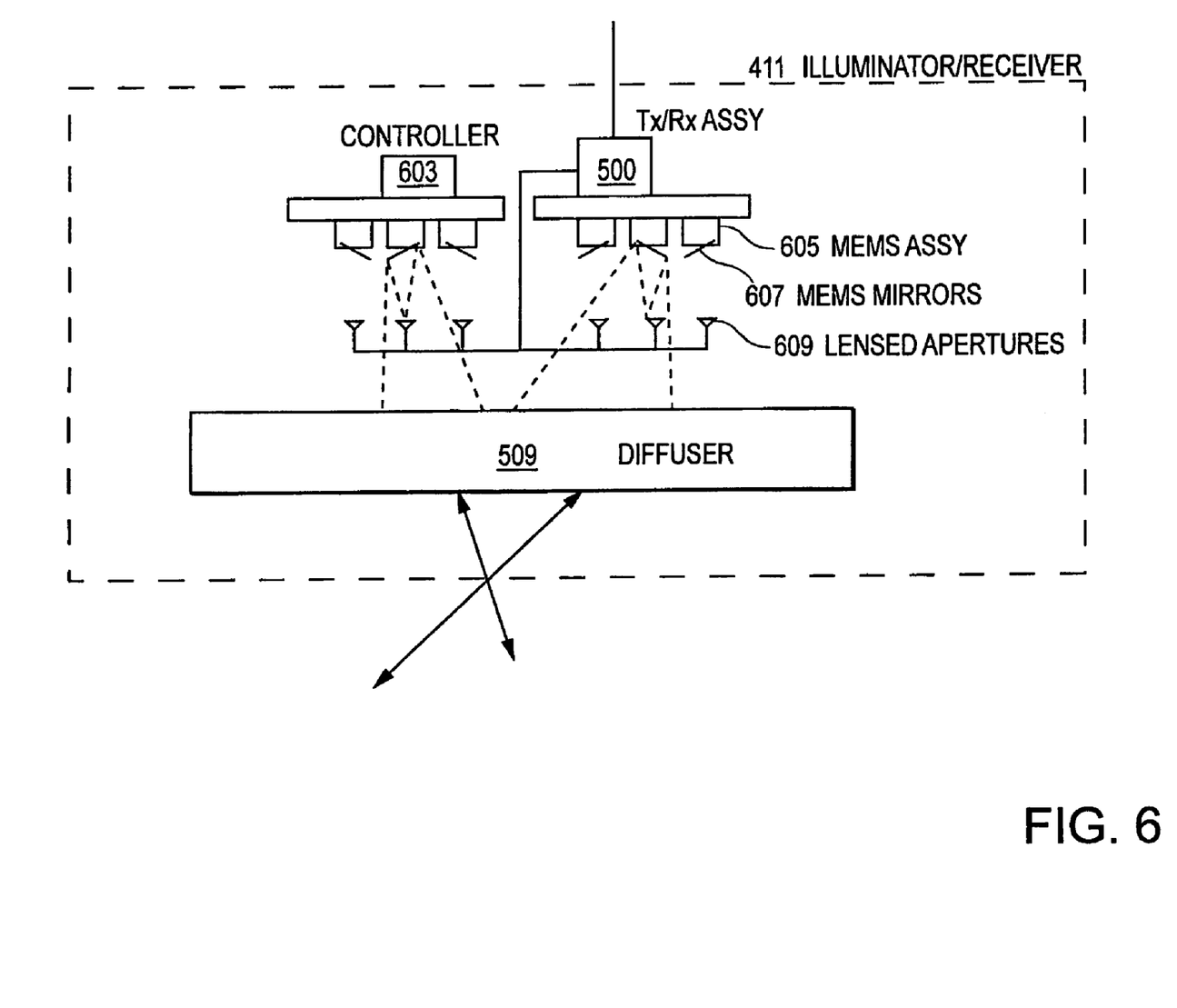
FIG. 6 is a block diagram of a second embodiment of the room illuminator/receiver of FIG. 4.

Another embodiment for the system to handle multiple users (i.e. multiple devices) in one room or to cover larger rooms such as auditoriums is shown in FIG. 6. FIG. 6 is a block diagram of a second embodiment of room illuminator/receiver of FIG. 4 according to an embodiment of the present invention. Depending on the variation of the particular system needs regarding the required user bandwidth and the number of in-room users, the system configuration can be varied to compensate accordingly.

FIG. 6 shows a multiple-beam MEMS array variant to the broad-angle holographic diffuser of FIG. 5. The use of MEMS devices to expand the coverage of optical wireless signals is disclosed in the above-referenced co-pending OPTSAT U.S. application Ser. No. 10/317,456. The wireless could connect to pre-existing fiber optic networks seamlessly (if MEMS/single mode) or with a multimode-to-single mode transition component (if diffuser/multimode). In this case a controller 603 is needed to assure that each MEMS mirror searches and then locks onto an in-room, activity radiating user device in a manner similar to a radar "conical scan" target lock-on algorithm. MEMS assemblies 605 are provided for directing the MEMS mirrors 607 based on directional control signals from controller 603, and contain micro-mechanical motors to physically direct the MEMS mirrors 607. Lensed apertures 609 transceive signals to and from transmit/receive assembly 500 by focusing the signals onto the MEMS mirrors and focusing signals received from the MEMS mirrors into the optical fiber. Optical holographic diffuser 509 is also shown in FIG. 6. In the figure multiple MEMS mirrors 607 are shown one for each device possible in a room. For example, in a small office, if 10 user stations were arranged, a 10 mirror version of the room illuminator/receiver 411 would be needed, which would include 10 MEMS assemblies 605, 10 MEMS mirrors 607, and 10 lensed apertures 609. Even though multiple mirrors are needed, all transmitted and received signals can be combined into a single wavelength-division-multiplexed fiber with a single erbium laser transmit/receive assembly per room.

Figure 7A:
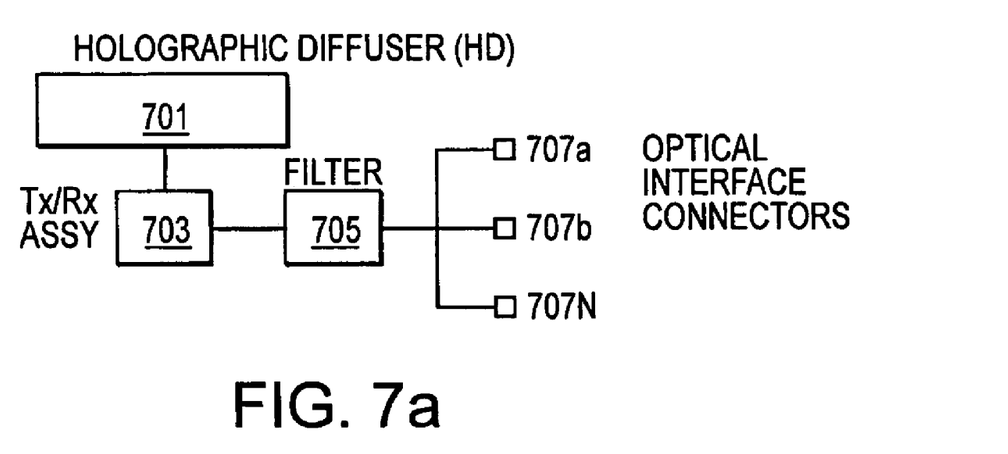
FIG. 7a is a block diagram of a bi-directional user attachment according to an embodiment of the present invention.

As stated earlier, user attachments are needed on current off-the-shelf devices to enable the transmission and reception of optical wireless signals, for example, an Ethernet™ electronic to fiber optic signal adapter. FIG. 7a is a block diagram of a bi-directional user attachment according to an embodiment of the present invention. Of course, if the device were capable of transceiving optical wireless signals the user attachment would not be required. Shown in FIG. 7a are optical holographic diffuser 701 for collecting and flooding optical wireless signals to and from the room, transmit/receive assembly 703 which is similar to transmit/receive assembly 500 as described in connection with FIG. 5, filter 705 that is set to the address of the particular device for filtering out all optical waveforms and channels not addressed to the device, and optical interface connectors 707a to 707N for connecting to individual devices (not shown). This bi-directional user attachment would be used for bi-directional devices such as telephones, computers, and interactive televisions. It is assumed that in the future all computers will contain optical ports for USB, Ethernet, and modem, etc. networks. If older computers were used, then off-the-shelf optical to RF adaptors would be needed between the optical wireless user attachment and the electronic computer ports.

Figure 7B:
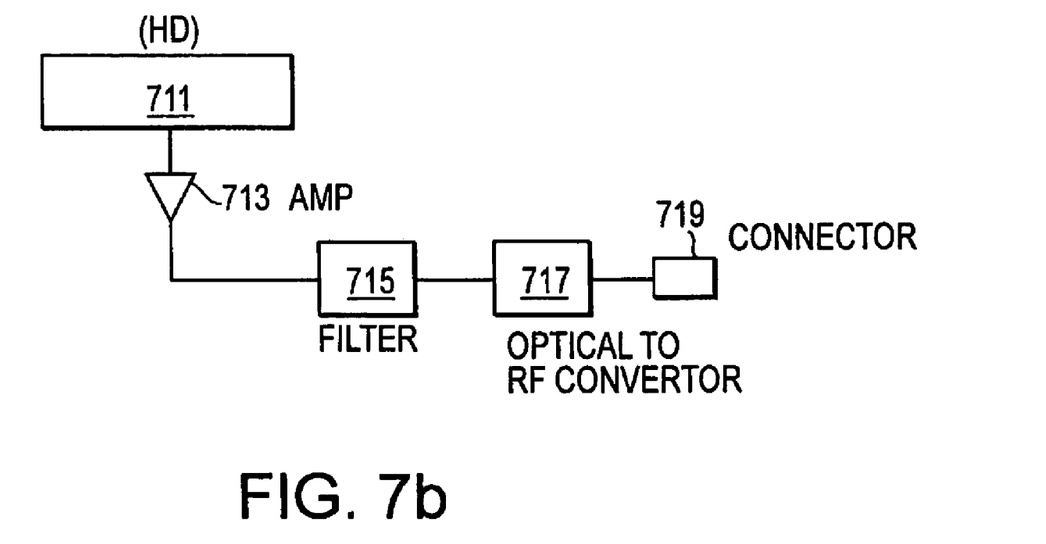
FIG. 7b is a block diagram of a unidirectional user attachment according to an embodiment of the present invention.

FIG. 7b is a block diagram of a unidirectional user attachment according to an embodiment of the present invention. FIG. 7b shows the configuration for the unidirectional user attachment. The unidirectional user attachment would be used for devices that only receive signals, such as televisions, radios, etc. Shown in FIG. 7b are optical holograph diffuser 711 for collecting optical wireless signals from the room, receive amplifier 713 for amplifying the received optical signals, filter 715 that is set to the address of the particular device for filtering out all optical waveforms and channels not addressed to the device, optical-to-RF converter 717 for converting the optical signal into an RF signal, and connector 719 for connecting to the device. The optical-to-RF converter would be required in devices that are not optical signal capable, and can be replaced by various converters as needed by the particular devices.

Figure 8:
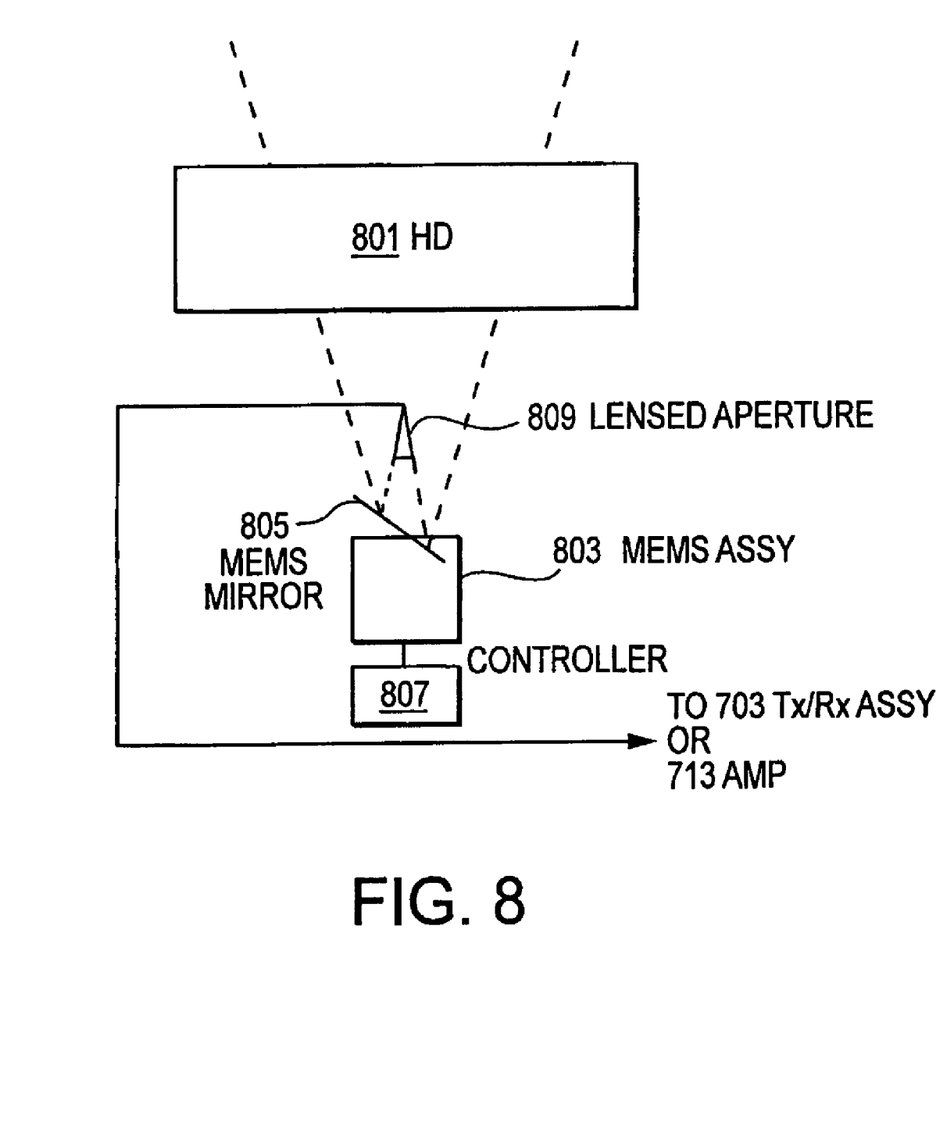
FIG. 8 is a block diagram illustrating an extended range version of a user attachment according to an embodiment of the present invention.

FIG. 8 is a block diagram illustrating an extended range version of a user attachment according to an embodiment of the present invention. Note, that with a multi-beam room illuminator/receiver similar to that shown in FIG. 6, it is likely that the devices can use the user attachments shown in FIGS. 7a and 7b. If further range is required, the extended range attachment shown in FIG. 8, a single-beam MEMS tracking assembly, could be used, and operates the same as the multi-beam MEMS device shown in FIG. 5. Single beam MEMS operation, also disclosed in the above-referenced co-pending OPTSAT U.S. application Ser. No. 10/317,456, is applicable to hand held PDAs (personal digital assistants). Shown in FIG. 8 are optical holograph diffuser 801 for collecting and/or flooding optical wireless signals to and/or from the room, MEMS mirror 805 for reflecting the optical wireless signal to and/or from optical holograph diffuser 801 and lensed aperture 809, MEMS assembly 803 for mechanically controlling the direction of MEMS mirror 805, and controller 807 for controlling the MEMS assembly. The optical signals either transmitted from or received by the lensed aperture 809 is sent to or received from the transmit/receive assembly 703 and/or the receive amplifier 713 as needed by the device requirements.

By incorporating lighting, heating and information transfer into one bundle of fiber optic cables, the costs of each of these systems drops dramatically. One of the greatest benefits of the information system disclosed herein is the unprecedented performance and compatibility of fiber to wireless, at costs that are comparable with much lower performing current systems like Bluetooth™. The heating/cooling solution is cheaper to install and operate than existing systems, more energy efficient, more reliable, more controllable, and provides a healthier internal environment (i.e. dust-free, unlike forced air). Also, the central lighting is cheaper and more efficient than present lighting, especially for large buildings. Additionally, the energy efficiency of any optical fiber based system adds to the over savings of the systems. Finally, the space-saving aspects of the present invention, as well as ease of installation, add to the overall appeal of the present invention.

The invention disclosed herein provides general considerations for conveyance of light, heat, and information over common optical fibers. Practical and business considerations may determine the best configuration, specifically whether it is desirable to use common fiber for all services together or whether a more optimized design might feature heat, light, and/or information on separate fiber lines. The following are examples and considerations. Because the most effective infrared heating wavelengths are considerably longer than the light and information wavelengths, standard glass fiber will generally not allow propagation of the longer wavelength IR. Appropriate fiber products for IR heat energy propagation include sapphire and chalcogenides. Such products are capable of also conveying light and information so that all three types of energy are propagated on the same IR-optimized fiber. It may be more efficient, however, to use separate fiber lines for IR heat and for light/information.

In addition, for user data rates above 1 G bps, single-mode, silicon fiber is necessary (coupled with directive beam apertures as identified above). Single mode fiber, while capable of carrying light as well, is not itself optimal for light illumination into a room. Light from a single mode fiber, even through a diffuser, would be very narrowly directed, although an alternative multi-faceted diffuser device, of considerable size, may be practical to flood the room from single mode fiber. Therefore, fiber carrying greater than 1G bps per-user information channels can be kept separate from the more practical multi-mode fiber for transmitting light which can then be made to flood a room via holographic diffusers.

Finally, if it is determined desirable to transmit IR heat or light, or both, on the same fiber as information, there could be a concern that the high power heat/light energy could impair operation of the information band laser transmit/receive amplifiers described above. Even though not in the amplifiers' band, heat/light signal loss and corresponding heating of the amplifiers beyond their design limits is possible. To mitigate this potential problem a 10 dB or 20 dB down optical coupler could be connected to the primary fiber carrying the light, heat, and information. The signal entering the coupler would only be 10%, or 1%, of the light/heat energy (10–20 W) being carried on the fiber and not likely to damage the laser that amplifies the information signal for room illumination. Also, amplification of the small information signal level into the coupler could recover the information signal and assure sufficient strength prior to illuminating the room. Further, the energy that continues on the primary fiber could illuminate the room with only an additional 1–10% loss (that entered the coupler).

The unprecedented performance of the wireless information system according to the present invention over present systems is staggering. Data transfer rates of 1G to 1T bps per user and up to hundreds of (potentially mobile) users per room, depending in part on required bandwidth, is contemplated.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for distributing at least one of information and photonic energy into at least one room of a building, comprising:

a lighting generator for generating visible light energy;

an infrared (IR) heat generator for generating IR heat energy;

an optical fiber subsystem for transceiving at least one of the visible light energy and the IR heat energy into the at least one room, wherein the optical fiber subsystem carries the visible light energy, the IR heat energy and optical information signals;

a local transmit and receive element for separating the visible light energy, the IR heat energy and information signals;

a light lens/diffuser for diffusing or focusing the visible light energy into the at least one room;

a heat diffuser for diffusing the IR heat energy into the at least one room; and a room illuminator/receiver for transceiving the information signals to and from the at least one room.

2. The system for distributing at least one of information and photonic energy into at least one room of a building of claim 1, wherein the optical fiber subsystem transmits optical information signals, radiates the optical information signals as optical wireless signals into the at least one room, and receives optical wireless signals from the at least one room.

3. The system for distributing at least one of information and photonic energy into at least one room of a building of claim 1, further comprising a data transfer subsystem for transceiving external information to and from the system.

4. The system for distributing at least one of information and photonic energy into at least one room of a building of claim 1, wherein the room illuminator/receiver comprises:

a combiner for combining the information signals of the optical fiber subsystem;

a transmit amplifier connected to the combiner, for amplifying the information signals to be transmitted into the at least one room;

a receive amplifier connected to the combiner, for amplifying the information signals received from the at least one room;

a circulator for directing the information signals from the transmit amplifier and to the receiver amplifier; and an optical holograph diffuser for propagating and receiving optical wireless information signals into and from the at least one room.

5. The system for distributing at least one of information and photonic energy into at least one room of a building of claim 1, wherein the room illuminator/receiver comprises a micro-electro mechanical system (MEMS) mirror subsystem for transceiving optical wireless information signals from multiple sources in the at least one room.

6. The system for distributing at least one of information and photonic energy into at least one room of a building of claim 1, wherein the lighting generator comprises:

a lamp enclosure connected to the optical fiber subsystem; and at least one lamp for generating the visible light energy, wherein the visible light energy is transferred to the optical fiber subsystem for transmission throughout the system.

7. The system for distributing at least one of information and photonic energy into at least one room of a building of claim 6, wherein the lamp enclosure further comprises an inner surface of highly polished material.

8. The system for distributing at least one of information and photonic energy into at least one room of a building of claim 1, wherein the IR heat generator comprises:

a lamp enclosure connected to the optical fiber subsystem; and at least one infrared lamp for generating the IR heat energy, wherein the IR heat energy is transferred to the optical fiber subsystem for transmission throughout the system.

9. The system for distributing at least one of information and photonic energy into at least one room of a building of claim 1, wherein the lighting generator and the IR heat generator are combined into one unit.

10. The system for distributing at least one of information and photonic energy into at least one room of a building of claim 1, wherein the lighting generator is comprised of at least two light sources each having a different color.

11. The system for distributing at least one of information and photonic energy into at least one room of a building of claim 1, wherein quality of service (QoS) classes for transceiving the information signals are comprised of a single user mode and a multi user mode.

12. A system for distributing at least one of information and photonic energy into at least one room of a building comprising:

a lighting generator for generating visible light energy;

an infrared (IR) heat generator for generating IR heat energy;

an optical fiber subsystem for transceiving at least one of the visible light energy and the IR heat energy into the at least one room; and a heat dissipation system comprising:

a shutter, constructed into a wall defining an inside space and an outside space, for opening and closing to control the flow of heat through the shutter from the inside space to the outside space;

a heat sink located adjacent to the wall in the outside space and adjacent to the shutter, for transferring heat from a first location adjacent to the shutter to a second location; and a heat dissipater for dissipating heat from the second location.

13. The system for distributing at least one of information and photonic energy into at least one room of a building of claim 12, wherein the heat dissipater of the heat dissipation system is one of a radiator and a condenser.

14. The system for distributing at least one of information and photonic energy into at least one room of a building of claim 1, further comprising a user attachment connectable to a user device, for converting the optical wireless signals into electrical signals compatible with the user device.

15. The system for distributing at least one of information and photonic energy into at least one room of a building of claim 14, wherein the user attachment comprises:

an optical holographic diffuser for receiving the optical wireless signals and transmitting the optical wireless signals into a optical fiber;

a receiver amplifier for amplifying the optical fiber signals; and a connector operably connected to the receiver amplifier for connecting to the user device.

16. The system for distributing at least one of information and photonic energy into at least one room of a building of claim 15, wherein the user attachment further comprises a micro-electro mechanical system (MEMS) mirror for directing the optical wireless signal.

17. The system for distributing at least one of information and photonic energy into at least one room of a building of claim 15, wherein the user attachment further comprises a transmitter amplifier for amplifying optical fiber signals from the user device for propagation through the optical holographic diffuser into optical wireless signals.

18. The system for distributing at least one of information and photonic energy into at least one room of a building of claim 17, wherein the user attachment further comprises a micro-electro mechanical system (MEMS) mirror for directing the optical wireless signal.

19. The system for distributing at least one of information and photonic energy into at least one room of a building of claim 15, wherein the user attachment further comprises a converter to convert optical fiber signals to and from signals compatible with the user device.

* * * * *